United States Patent
Schmidt

(10) Patent No.: US 9,562,584 B2
(45) Date of Patent: Feb. 7, 2017

(54) AIRCRAFT LANDING GEAR FLUID GAUGE

(71) Applicant: Messier-Dowty Limited, Gloucester (GB)

(72) Inventor: Kyle Schmidt, Cheltenham (GB)

(73) Assignee: Safran Landing Systems UK LTD, Gloucester (GB)

( * ) Notice: Subject to any disclaimer, the term of this patent is extended or adjusted under 35 U.S.C. 154(b) by 267 days.

(21) Appl. No.: 14/357,071

(22) PCT Filed: Nov. 1, 2012

(86) PCT No.: PCT/GB2012/052723
§ 371 (c)(1),
(2) Date: May 8, 2014

(87) PCT Pub. No.: WO2013/068725
PCT Pub. Date: May 16, 2013

(65) Prior Publication Data
US 2014/0312171 A1    Oct. 23, 2014

(30) Foreign Application Priority Data

Nov. 11, 2011   (GB) .................................. 1119493.3

(51) Int. Cl.
*F16F 9/32* (2006.01)
*B64C 25/60* (2006.01)
*F16F 9/06* (2006.01)

(52) U.S. Cl.
CPC ............. *F16F 9/3264* (2013.01); *B64C 25/60* (2013.01); *F16F 9/06* (2013.01)

(58) Field of Classification Search
CPC ..... B64C 25/60; F16F 9/3264; F16F 2230/08; F16F 9/06
See application file for complete search history.

(56) References Cited

U.S. PATENT DOCUMENTS 2,856,127 A * 10/1958 Kolisch .................... B64D 9/00
701/124
4,092,947 A    6/1978 Labrecque
(Continued)

FOREIGN PATENT DOCUMENTS

| CN | 101821162 | 9/2010 |
|----|-----------|--------|
| CN | 102080702 | 6/2011 |

(Continued)

OTHER PUBLICATIONS

Afaneh A, Alzebda S, Ivchenko V, Kalashnikov AN. "Ultrasonic measurements of temperature in aqueous solutions: why and how"; Physics Research International. Apr. 20, 2011; 2011.*

(Continued)

*Primary Examiner* — Tien Dinh
*Assistant Examiner* — Alexander V Giczy
(74) *Attorney, Agent, or Firm* — RatnerPrestia

(57) ABSTRACT

An oleo-pneumatic shock absorber having a casing, a rod slidably mounted in the casing, first and second fluids in the casing, and a gauge. The gauge has a substrate positioned on the shock absorber. The substrate has a first region with a slot sized to fit an ultrasonic transducer arranged to encompass a range of possible oil levels within the shock absorber, a second region corresponding to a range of possible extension states of the shock absorber and a third region comprising one or more traces. Each trace corresponds to a temperature value and is indicative of an optimum relationship between the oil levels and the range of extension states at the respective temperature value associated with the trace.

15 Claims, 3 Drawing Sheets

(56) References Cited

U.S. PATENT DOCUMENTS

| | | | |
|---|---|---|---|
| 4,280,126 A | 7/1981 | White | |
| 5,104,144 A | 4/1992 | Bethell | |
| 5,148,896 A * | 9/1992 | Ralph | B64C 25/60 188/314 |
| 5,788,028 A | 8/1998 | Bieber | |
| 6,601,000 B1 | 7/2003 | Barlian et al. | |
| 7,454,275 B2 | 11/2008 | Seror | |
| 2004/0129834 A1 | 7/2004 | Luce | |
| 2005/0230200 A1 | 10/2005 | Seror | |
| 2006/0106582 A1* | 5/2006 | Schmidt | G01D 9/005 702/189 |
| 2006/0144997 A1* | 7/2006 | Schmidt | B64F 5/0045 244/100 R |
| 2008/0163668 A1 | 7/2008 | Kurtz et al. | |
| 2010/0017052 A1 | 1/2010 | Luce | |
| 2012/0053783 A1* | 3/2012 | Nance | G01M 17/04 701/33.1 |
| 2015/0267769 A1* | 9/2015 | Fazeli | F16F 9/3264 701/3 |
| 2015/0268084 A1* | 9/2015 | Southern | G01F 23/284 188/269 |
| 2016/0001623 A1* | 1/2016 | Cox | B60G 15/063 267/286 |

FOREIGN PATENT DOCUMENTS

| | | |
|---|---|---|
| DE | 19900832 | 7/2000 |
| DE | 20009268 | 1/2001 |
| DE | 102005037724 | 2/2007 |
| EP | 1588872 | 10/2005 |
| FR | 2693550 | 1/1994 |
| JP | 52-122777 | 10/1977 |
| JP | H11171097 | 6/1999 |
| JP | 2009 103197 | 5/2009 |
| WO | WO92/15846 | 9/1992 |
| WO | WO2007/028365 | 3/2007 |

OTHER PUBLICATIONS

Cobb, W. N. "Non-Intrusive, Ultrasonic Measurement of Fluid Composition." Review of Progress in Quantitative Nondestructive Evaluation. Springer US, 1999. 2177-2183.*
Green, S. F. "An acoustic technique for rapid temperature distribution measurement." The Journal of the Acoustical Society of America 77.2 (1985): 759-763.*
Sonny T. Chai and William H. Mason, Chapter 5 "Shock Absorber Design", revised Apr. 1, 1997 in "Landing Gear Integration in Aircraft Conceptual Design", MAD Sep. 1, 1996, Sep. 1996. Accessed from http://www.dept.aoe.vt.edu/~mason/Mason_f/M96SC05.pdf, http://www.dept.aoe.vt.edu/~mason/Mason_f/M96SC.html, Mar. 13, 2016.*
International Search Report for PCT International Application No. PCT/GB2012/052723 dated Mar. 7, 2013.
Office Action for Chinese Application No. 201280053437.0 dated May 6, 2015.
Combined Search and Examination Report for Application No. GB1119493.3 dated Mar. 12, 2012.
International Search Report and Written Opinion for PCT International Application No. PCT/GB2012/052723 dated Mar. 7, 2013.
Presentation titled: "Landing Gear Strut Hydraulic Fluid Level Sensor," from Fall 2001 Meeting in San Antonio, TX, Oct. 2001.

* cited by examiner

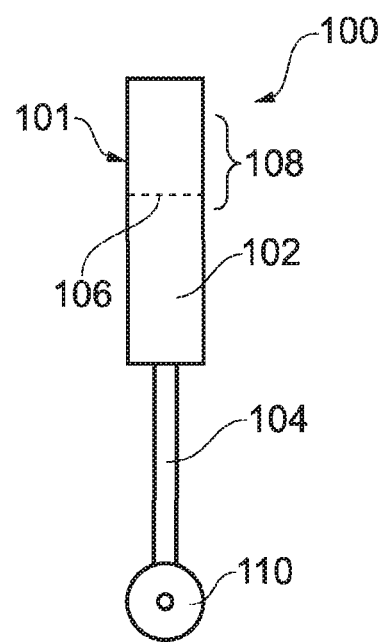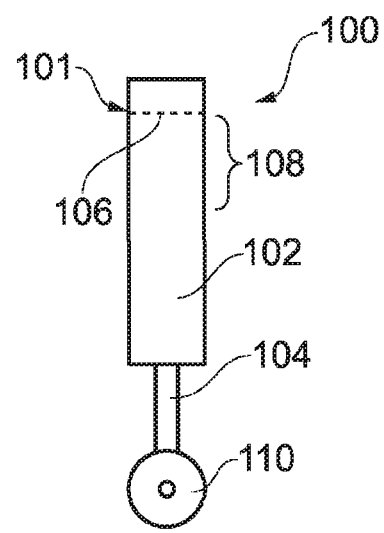
FIG. 1a
Prior Art
FIG. 1b
Prior Art

AIRCRAFT LANDING GEAR FLUID GAUGE

This application is a U.S. National Phase application of PCT International Application No. PCT/GB2012/052723, filed Nov. 1, 2012, which claims the benefit of GB 1119493.3, filed Nov. 11, 2011.

BACKGROUND

An aircraft landing gear generally includes a shock absorber arranged to perform spring and damper functions. The shock absorber may contain hydraulic fluid, such as oil. An example of such a shock absorber is the "oleo-pneumatic" type, which combines oil and gas within a vessel to perform spring and damper functions.

For a fluid-containing shock absorber, the quantity of fluid present in the vessel is important in terms of ensuring the appropriate performance thereof. However, leakage and inappropriate servicing can lead to an inappropriate quantity of fluid in the vessel.

The present inventor has identified that a need exists for a means by which the appropriateness of the fluid level within such a shock absorber or other vessel can be determined in a manner which is one or more of: quick; simple; reliable; cheap to employ; and a low burden in terms of adding additional weight and/or complexity to the shock absorber.

SUMMARY

In accordance with a first aspect of the present invention, there is provided a gauge for indicating whether the oil level in an oleo-pneumatic shock absorber requires modification, the gauge comprising:
 a substrate for positioning relative to the oleo-pneumatic shock absorber, the substrate comprising:
 a first region arranged to encompass a range of possible oil levels within the oleo-pneumatic shock absorber;
 a second region corresponding to a range of possible extension states of the oleo-pneumatic shock absorber; and
 a third region comprising one or more traces, each trace corresponding to a temperature value and being indicative of an optimum relationship between the range of possible oil levels and the range of possible extension states at the respective temperature value associated with the trace.

Thus, the invention according to this aspect provides a gauge which can be used in maintenance situations to determine whether the fluid level, such as oil level, within a shock absorber requires modification. The fluid level in the shock absorber is determined to identify a point within the first region. This is generally achieved by locating a boundary between first and second fluids within the vessel i.e. a fluid interface such as an oil/gas interface. Knowing the temperature of the fluid and the extension state of the shock absorber, the user can visually compare the measured point within the first region with the optimum value given by the respective trace to determine whether the fluid level requires modification. Thus, a user may rapidly select the correct course of action substantially without the exercise of particular expertise, calculation or reference to other data sources.

The third region may comprise a plurality of traces, each trace corresponding to a different temperature value.

The range of possible oil levels may be a range of possible oil levels during in-use, on-ground, conditions of an aircraft.

The substrate may comprise a hard material, such as hard plastics or a metal, for example aluminium.

The first region may be arranged to define an x-axis. The second region may be arranged to define a y-axis. The third region may be arranged to define a graph between the x-axis and y-axis.

The first region may comprise a space adjacent an edge of the substrate.

The first region may comprise a slot in the substrate. The slot may be sized to accommodate a measurement portion of an ultrasonic transducer.

In accordance with a second aspect of the present invention, there is provided an aircraft landing gear comprising an oleo pneumatic shock absorber and a gauge according to the first aspect attached to the shock absorber such that the first region of the gauge encompasses a range of possible oil levels for the shock absorber.

The range of possible oil levels may comprise a range of possible oil levels during in-use, on-ground conditions.

In accordance with a third aspect of the present invention, there is provided an aircraft including an aircraft landing gear according to the second aspect.

In accordance with a fourth aspect of the present invention, there is provided a method of indicating whether a quantity of first fluid within a vessel containing the first fluid and a second fluid separated by a fluid interface requires modification, the method comprising the steps of:
 identify a first point within a first region of a gauge, the first point corresponding to the interface between the first and second fluids;
 identifying a second point within a second region of the gauge, the second point corresponding to an extension state of the vessel;
 identifying a coordinate in a third region of the gauge, the coordinate being defined by the first and second points, the third region comprising one or more traces, the each trace corresponding to a temperature value and being indicative of an optimum relationship between the a range of possible values for the fluid interface, and a range of possible values for the extension state at the respective temperature value associated with the trace;
 measuring the temperature of a fluid or solid which is relatable to the first or second fluid;
 identifying a trace corresponding most closely to the measured temperature; and
 comparing the coordinate with the identified trace to indicate whether the quantity of first fluid requires modification.

The step of identifying a first point within a first region may comprise moving an ultrasonic sensor within the first region to identify the first point corresponding to the fluid interface. The step of measuring the temperature of a fluid or solid which is relatable to the fluid may comprise using the ultrasonic sensor to measure the temperature of the first fluid.

The vessel may be an oleo-pneumatic shock absorber. The first fluid may comprise oil. The second fluid may comprise a gas, such as nitrogen.

BRIEF DESCRIPTION OF THE DRAWINGS

By way of example only, certain embodiments of the invention will now be described by reference to the accompanying drawings, in which:

FIG. 1a is a diagram an aircraft landing gear including a conventional oleo-pneumatic shock absorber in an extended state;

FIG. 1b is a diagram of the aircraft landing gear of FIG. 1a with the oleo-pneumatic shock absorber in a compressed state;

DETAILED DESCRIPTION

Figure 2:
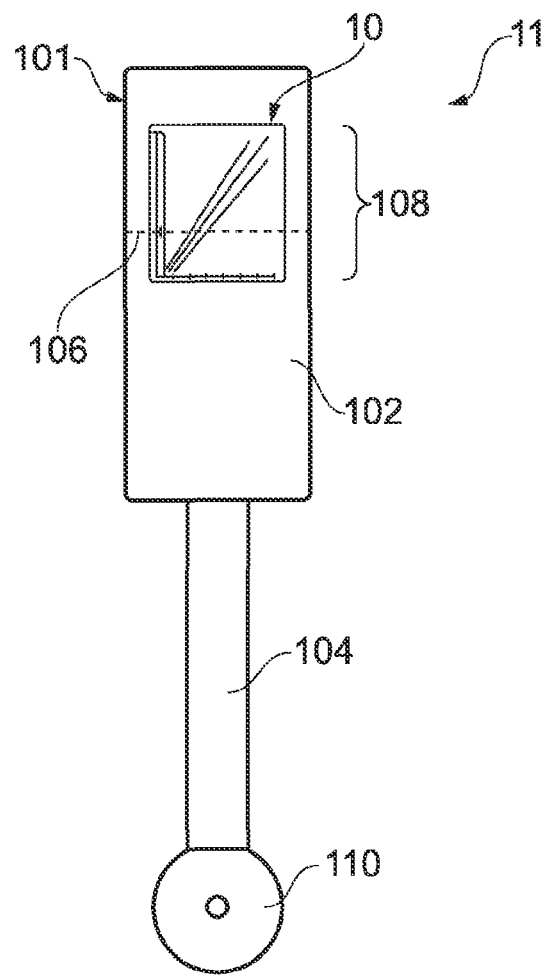
FIG. 2 is a diagram of an aircraft landing gear according to an embodiment of the present invention, including the oleo-pneumatic shock absorber of FIG. 1a in combination with a gauge according to an embodiment of the present invention.

Referring to FIG. 1a, a diagram of a conventional aircraft landing gear 100 is shown. For clarity, not all parts of the landing gear 100 are shown.

The landing gear 100 includes a conventional oleo-pneumatic shock absorber 101. A person skilled in the art will be familiar with such a shock absorber 101 and as such, for brevity, its function will only be described briefly. The shock absorber 101 has a casing 102 and a rod 104 slidably mounted therein. A wheel assembly 110 is coupled to a lower region of the rod 104. The shock absorber 101 defines a vessel (not shown) which varies in volume in accordance with the level of extension of the shock absorber 101. The vessel includes oil and nitrogen gas. The oil level within the shock absorber 101 is defined by a fluid interface 106, this being a generally planar interface between the oil and gas within the vessel. This interface 106 can be detected in a number of ways, some of which are described in more detail below.

When the shock absorber 101 is in a relatively extended condition, as shown in FIG. 1a, the oil level 106 is at a relatively low level. Referring additionally to FIG. 1b, when the shock absorber 101 is in a relatively compressed condition, as shown in FIG. 1b, the oil level 106 is at a relatively high level, due to compression of the gas within the vessel. Thus, a range of possible oil levels 108 is defined.

FIG. 2 shows an aircraft landing gear 11 according to an embodiment of the present invention. For clarity, not all parts of the landing gear 11 are shown.

Like the known landing gear 100, the landing gear 11 of the illustrated embodiment includes a conventional oleo-pneumatic shock absorber 101. However, the shock absorber 101 is in combination with a gauge 10 according to an embodiment of the present invention.

Figure 3:
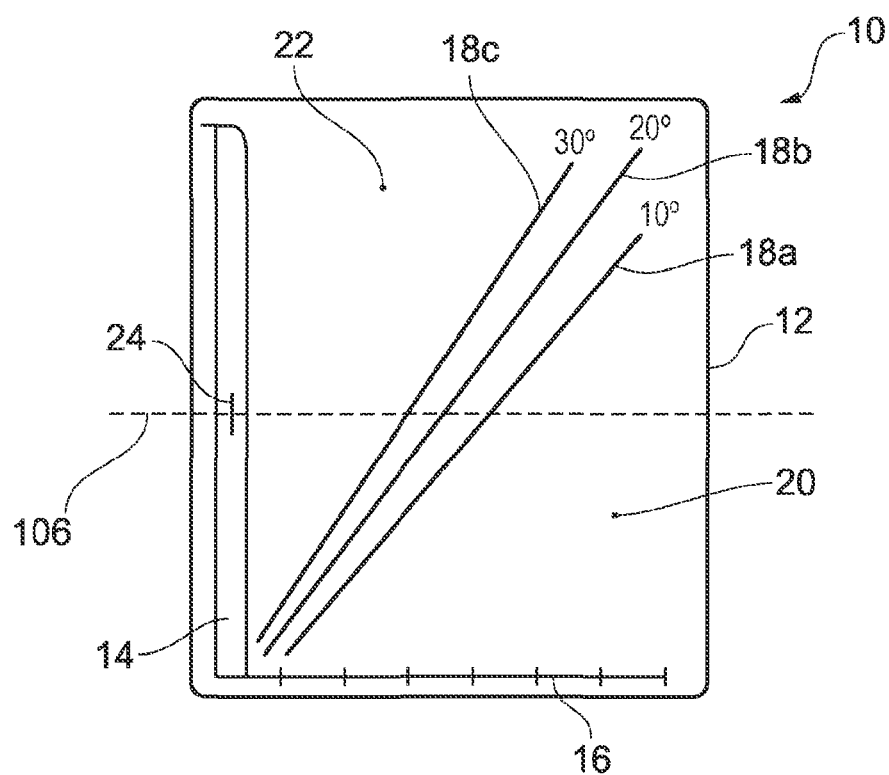
FIG. 3 is a diagram of the gauge of FIG. 2.

Referring additionally to FIG. 3, the gauge 10 comprises a generally rectangular plate 12 made from aluminium or any other suitable hard material, such as metal or hard plastics. The gauge 10 may be attached to the shock absorber 101 by any suitable means, such as bonding with adhesive or by way of a suitable mechanical fixing.

A slot 14 formed through a major face of the plate 12. The slot 14 extends along and parallel to an edge of the plate 12 and defines a first region arranged to encompass the range of possible oil levels 108 within the oleo-pneumatic shock absorber 101. By "encompass", it is meant that a range of possible oil levels cross or in some other way are relatable to the slot 14 such that the oil level may be detected by a sensor located within the slot 14. As such, the slot 14 defines a guide channel within which a sensor, such as an ultrasonic sensor, may be positioned and swept to find the oil level 106 within the shock absorber 101. The slot 14 may be considered as defining a y-axis having a range of possible values to which the oil level 106 may correspond.

The plate further includes an x-axis 16 which defines a second region corresponding to a range of possible extension states of the oleo-pneumatic shock absorber 101. For example, the number of inches or centimeters between two measurable points on the landing gear, such as the distance between the casing 102 and the wheel assembly 110. In this embodiment, the x-axis is substantially orthogonal with respect to the longitudinal axis of the slot 14. The x-axis 16 and its values may be marked in any visually apparent manner; non-limiting examples are by engraving, painting or the like.

The area between the slot 14 and x-axis 16 defines a third region comprising, in the illustrated embodiment, three traces 18a, 18b, 18c. Each trace 18a, 18b, 18c corresponds to a temperature value for the oil within the shock absorber 101. For example, trace 18a is for an oil temperature of 10° C., trace 18b is for an oil temperature of 20° C. and trace 18c is for an oil temperature of 30° C. Any suitable number of traces may be provided, keeping in mind the balance between resolution and clarity. Each trace 18a, 18b, 18c provides a graphical representation of an optimum relationship between the range of possible oil level values within the slot 14 and the range of extension states on the x-axis 16 at the respective temperature value associated with the trace 18a, 18b, 18c. The trace 18a, 18b, 18c may be marked in any visually apparent manner; non-limiting examples are by engraving, painting or the like.

While in the illustrated embodiment the traces represent oil temperature values, in other embodiments the temperature values may be ambient temperature or the temperature of the shock strut. However, oil temperature may provide the highest degree of accuracy and in embodiments where the gauge is arranged for use with an ultrasonic sensor to determine the oil/gas boundary, the time of flight measurement may advantageously be used to determine the temperature of the oil, by knowing both the dilation of the vessel and the speed of sound in oil dependency with temperature.

In use, with the landing gear 11 supporting an aircraft on the ground (not shown), the oil level 106 of the oleo-pneumatic shock absorber 101 may be determined by running a sensor along the slot 14 to identify a point within the first region which coincides with the general plane of the oil level 106. Knowing the temperature of the oil and the extension state of the shock absorber 101, the user can visually compare the measured point in the first region 14 to the optimum value given by the respective trace 18a, 18b, 18c to determine whether the oil level requires modification. For example, a coordinate defined by the measured point within the first region 14 corresponding to the oil level 106 and the measured extension state may be determined within the third region and if the coordinate is on a first side 22 of the respective trace then the user knows that oil should be removed, and if the coordinate is a second side 20 of the respective trace then the user knows that oil should be added. Thus, a user may rapidly select the correct course of action substantially without the exercise of particular expertise, calculation or reference to other data sources.

While the gauge has been described for use with a oleo-pneumatic shock absorber, in other embodiments the gauge may be arranged to indicate whether the fluid level in any suitable vessel having a fluid/fluid interface, such as a liquid/gas interface, requires modification. For example, the gauge may be used with reservoirs, hydraulic accumulators and the like.

The gauge according to embodiments of the invention may have any suitable first region arranged to encompass a range of possible fluid levels within a fluid-containing shock absorber and enable or permit the fluid level to be determined. For example, rather than including a slot 14, the gauge may be arranged for a sensor to be swept along its side face. In other embodiments the gauge may include a fluid detection strip that measures the temperature within the shock absorber to find the fluid level. For example, the gauge may include a strip that changes colour dependent on temperature. In such a case, the wall of the shock absorber, or other vessel, should be arranged to permit a reading, such as being thin enough to permit a temperature difference between the oil filled area and gas filled area to be identified if both are heated, or cooled, and then allowed to return to the ambient state; in such a case, the surface adjacent to the gas would cool or heat more rapidly than the surface adjacent to the liquid, allowing an indication by temperature of the gas/liquid interface.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" can mean "including" and therefore does not exclude the presence of elements or steps other than those listed in any claim or the specification as a whole. The singular reference of an element does not exclude the plural reference of such elements. In an apparatus claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An oleo-pneumatic shock absorber comprising:
   a shock absorber casing;
   a rod slidably mounted in the casing;
   a first fluid and a second fluid contained within the shock absorber and separated by a fluid interface defining an oil level within the shock absorber;
   a substrate positioned on the oleo-pneumatic shock absorber, the substrate comprising:
      a first region located on the oleo-pneumatic shock absorber in parallel to a range of possible oil levels within the oleo-pneumatic shock absorber, the first region comprising a slot in the substrate sized to accommodate a measurement portion of an ultrasonic transducer;
      a second region extending away from the first region and identifying a range of possible extension states of the oleo-pneumatic shock absorber; and
      a third region adjacent the first region and the second region and comprising one or more traces, each trace identifying an oil temperature value and being indicative of an optimum relationship between the range of possible oil levels and the range of possible extension states at the respective oil temperature value associated with the trace.

2. The oleo-pneumatic shock absorber according to claim 1, wherein the third region comprises a plurality of traces, each trace identifying a different oil temperature value.

3. The oleo-pneumatic shock absorber according to claim 1, wherein the range of possible oil levels are a range of possible oil levels during in-use, on-ground, conditions.

4. The oleo-pneumatic shock absorber according to claim 1, wherein the substrate comprises a plastic or metal material.

5. The oleo-pneumatic shock absorber according to claim 4, wherein the substrate comprises aluminium.

6. The oleo-pneumatic shock absorber according to claim 1, wherein the first region is arranged to define a y-axis, the second region is arranged to define an x-axis, and the third region is arranged to define a graph between the x-axis and the y-axis.

7. The oleo-pneumatic shock absorber according to claim 1, wherein the first region is adjacent an edge of the substrate.

8. The oleo-pneumatic shock absorber of claim 1, wherein the oil temperature value of each trace corresponds to a temperature of the oil as can be measured directly or through a solid part of the oleo-pneumatic shock absorber that is relatable to the temperature of the oil.

9. An aircraft landing gear comprising the oleo pneumatic shock absorber according to claim 1.

10. The aircraft landing gear according to claim 9, wherein the range of possible oil levels are a range of possible oil levels during in-use, on-ground conditions.

11. An aircraft including the aircraft landing gear according to claim 9.

12. A method of determining a need to modify a condition of an oleo-pneumatic shock absorber, the method comprising:
   providing the oleo-pneumatic shock absorber comprising a casing and a rod slidably mounted to the casing, and containing a first fluid and a second fluid separated by a fluid interface;
   providing a gauge on the shock absorber having a first region comprising a slot sized to accommodate a measurement portion of an ultrasonic transducer;
   identifying, within the first region of the gauge, a first point on the oleo-pneumatic shock absorber corresponding to the fluid interface;
   determining an extension state of the rod relative to the casing;
   identifying a second point within a second region of the gauge, the second point corresponding to the extension state;
   obtaining a measured temperature of the first fluid;
   identifying a coordinate in a third region of the gauge, the coordinate being defined by the first and second points, the third region comprising one or more traces, each trace corresponding to a predetermined first fluid temperature value and being indicative of an optimum relationship between a range of possible values for the fluid interface and a range of possible values for the extension state at the respective temperature value associated with the trace;
   identifying one of the one or more traces corresponding most closely to the measured temperature; and
   comparing the coordinate with the identified one of the one or more traces to indicate whether a quantity of first fluid requires modification.

13. The method according to claim 12, whereby:
   the step of identifying the first point within the first region comprises moving an ultrasonic sensor within the first region to identify the first point corresponding to the fluid interface; and
   the step of obtaining the measured temperature of the first fluid comprises using the ultrasonic sensor to obtain the measured temperature of the first fluid.

14. The method according to claim 12, wherein obtaining the measured temperature of the first fluid comprises directly measuring the temperature of the first fluid or measuring a temperature of a solid part of the oleo-pneumatic shock absorber to obtain a temperature measurement that is relatable to the temperature of the first fluid.

15. An oleo-pneumatic shock absorber comprising:
a shock absorber casing;
a rod slidably mounted in the casing;
a first fluid and a second fluid contained within the shock absorber and separated by a fluid interface defining an oil level within the shock absorber;
a substrate positioned on the oleo-pneumatic shock absorber, the substrate comprising:
  a first region located on the oleo-pneumatic shock absorber in parallel to a range of possible oil levels within the oleo-pneumatic shock absorber, the first region being arranged to define a y-axis;
  a second region extending away from the first region to define an x-axis identifying a range of possible extension states of the oleo-pneumatic shock absorber; and
  a third region arranged to define a graph between the x-axis and the y-axis and comprising one or more traces, each trace identifying an oil temperature value and being indicative of an optimum relationship between the range of possible oil levels and the range of possible extension states at the respective oil temperature value associated with the trace;
wherein the first region is defined by a side face of the substrate and configured to receive a measurement portion of an ultrasonic transducer.

* * * * *